(12) United States Patent
Zhang et al.

(10) Patent No.: US 10,409,782 B2
(45) Date of Patent: Sep. 10, 2019

(54) PLATFORM, SYSTEM, PROCESS FOR DISTRIBUTED GRAPH DATABASES AND COMPUTING

(71) Applicant: GRAPH INTELLIGENCE INC., North York (CA)

(72) Inventors: Chen Zhang, North York (CA); Jing Wu, North York (CA)

(73) Assignees: Chen Zhang, North York, Ontario (CA); Jing Wu, North York, Ontario (CA)

( * ) Notice: Subject to any disclaimer, the term of this patent is extended or adjusted under 35 U.S.C. 154(b) by 210 days.

(21) Appl. No.: 15/624,246

(22) Filed: Jun. 15, 2017

(65) Prior Publication Data

US 2017/0364534 A1    Dec. 21, 2017

Related U.S. Application Data

(60) Provisional application No. 62/350,235, filed on Jun. 15, 2016.

(51) Int. Cl.
| | |
|---|---|
| *G06F 16/182* | (2019.01) |
| *G06N 5/04* | (2006.01) |
| *G06N 20/00* | (2019.01) |
| *G06F 16/28* | (2019.01) |
| *G06F 16/901* | (2019.01) |
| *G06F 16/26* | (2019.01) |
| *G06F 16/25* | (2019.01) |

(52) U.S. Cl.
CPC .......... *G06F 16/182* (2019.01); *G06F 16/256* (2019.01); *G06F 16/26* (2019.01); *G06F 16/284* (2019.01); *G06F 16/9024* (2019.01); *G06N 5/04* (2013.01); *G06N 20/00* (2019.01)

(58) Field of Classification Search
CPC ...... G06F 16/185; G06F 16/26; G06F 16/284; G06F 16/182; G06F 16/256; G06F 16/9024; G06N 5/04; G06N 20/00
USPC ................................ 707/798, 149; 709/224
See application file for complete search history.

(56) References Cited

U.S. PATENT DOCUMENTS

| | | | |
|---|---|---|---|
| 2004/0111255 A1* | 6/2004 | Huerta | G06F 17/278 704/10 |
| 2008/0098375 A1* | 4/2008 | Isard | G06F 9/5066 717/149 |
| 2012/0054554 A1* | 3/2012 | Dagan | G06F 11/0712 714/39 |
| 2014/0019490 A1* | 1/2014 | Roy | G06F 16/2228 707/798 |

(Continued)

OTHER PUBLICATIONS

USENIX, Jun. 14,2017. "PowerGraph: Distributed Graph-Parallel Computation on Natural Graphs by Gonzalez et al." (https://www.usenix.org/node/170825.

(Continued)

*Primary Examiner* — Cam Y T Truong
(74) *Attorney, Agent, or Firm* — Norton Rose Fulbright Canada LLP

(57) ABSTRACT

Systems for distributed graph data management that use graph structures to model data and respond to different types of queries. Systems that provide analytic tools and machine learning based on graph structures. Systems for distributed graph data management that provide packaged solutions for different application areas.

11 Claims, 14 Drawing Sheets

(56) References Cited

U.S. PATENT DOCUMENTS

| | | | |
|---|---|---|---|
| 2014/0074888 A1* | 3/2014 | Potter | G06F 16/2428 |
| | | | 707/779 |
| 2016/0063037 A1* | 3/2016 | Savkli | G06F 16/532 |
| | | | 707/722 |
| 2017/0091337 A1* | 3/2017 | Patterson | G06Q 50/01 |
| 2018/0075159 A1* | 3/2018 | Lin | G06F 16/9024 |

OTHER PUBLICATIONS

Zhang, et al. HBaseSI: Multi-row Distributed Transactions with Global Strong Snapshot Isolation on Clouds, Scalable Computing: Practice and Experience, 2011, vol. 12, No. 2, pp. 209-226.

\* cited by examiner

800

Node status - 802

| Node | status | Recent Heartbeat | Recent Assignment | Load Score | IP |
|---|---|---|---|---|---|
| X | active | time h1 | time a1 | 14 | ip1 |
| Y | active | time h2 | time a2 | 89 | ip2 |
| Z | active | time h3 | time a3 | 58 | ip3 |
| W | active | time h4 | time a4 | 5 | ip4 |
| Q | inactive | time h0 | time a0 | 0 | ip5 |

Data placement - 804

| Data Item | status | Stable Assignment history time | Stable Assignment | Transitive Assignment history time | Transitive Assignment |
|---|---|---|---|---|---|
| A | assigned | (X, time s1), (Y, time s1') | X, Y | | |
| B | assigned | (Y, time s2), (Z, time s2') | Y, Z | | |
| C | assigned | (X, time s3), (Z, time s3') | X, Z | | |
| D | assigned, in transit | (Y, time s4), (X, time s4') | Y, X | (W, time t4) | Y to W |
| E | assigned | (Z, time s5), (X, time s5') | Z, X | | |
| F | assigned | (Z, time s6), (Y, time s6') | Z, Y | | |
| G | not assigned | | | | |

Vertex table 902

| Vertex ID | property1 | property2 | property3 | property4 |
|---|---|---|---|---|
| v1 | Jack | | | |
| v2 | Lily | 2014-12-26 | USA | Female |
| v3 | Bob | | | |

Edge table 904

| Edge ID | From | To | Directed | property1 | property2 | property3 |
|---|---|---|---|---|---|---|
| e1 | v2 | v3 | Yes | Family | | |
| e2 | v3 | v1 | No | | | |

FIG. 9

Binary file contrib/libs/com/graphintelligence/tranquilitydb/GI-hbase/1.0-SNAPSHOT/GI-hbase-1.0-SNAPSHOT.jar matches contrib/storage-hbase/src/main/java/org/apache/drill/exec/store/hbase/HBaseRecordReader.java Binary file exec/jdbc-all/target/drill-jdbc-all-1.9.0-SNAPSHOT.jar matches
contrib/data/target/classes/git.properties contrib/libs/com/graphintelligence/tranquilitydb/commons/1.0-SNAPSHOT/commons-1.0-SNAPSHOT.pom contrib/libs/com/graphintelligence/tranquilitydb/GI-hbase/1.0-SNAPSHOT/GI-hbase-1.0-SNAPSHOT.pom contrib/libs/com/graphintelligence/tranquilitydb/ide/1.0-SNAPSHOT/ide-1.0-SNAPSHOT.pom contrib/pom.xml contrib/storage-hive/target/classes/git.properties contrib/target/classes/git.properties contrib/target/maven-shared-archive-resources/META-INF/DEPENDENCIES
distribution/target/apache-drill-1.9.0-SNAPSHOT/apache-drill-1.9.0-SNAPSHOT/git.properties distribution/target/classes/git.properties exec/memory/target/classes/git.properties exec/target/classes/git.properties target/classes/git.properties tools/target/classes/git.properties

FIG. 10

Graph table 1100

| ID (vertex or edge) | vertex property1 | vertex property2 | vertex property3 | vertex property4 | edge from | edge to | edge directed | edge property1 | edge property2 | edge property3 |
|---|---|---|---|---|---|---|---|---|---|---|
| v1 | Jack | | | | | | | | | |
| v2 | Lily | 2014-12-26 | USA | Female | | | | | | |
| v3 | Bob | | | | | | | | | |
| e1 | | | | | v2 | v3 | Yes | Family | | |
| e2 | | | | | v3 | v1 | No | | | |

PLATFORM, SYSTEM, PROCESS FOR DISTRIBUTED GRAPH DATABASES AND COMPUTING

FIELD

The improvements generally relate to the field of distributed data processing and graph databases.

INTRODUCTION

A graph database is a database that uses graph structures with nodes, edges and properties to represent and store data. The graph structure defines relationships for the data. In relational databases, data relationships can be inferred through multi-table joins but this requires intensive use of computational and memory resources. Relational databases store and process highly structured data in tables with predetermined columns. However, relational databases can be inefficient and ineffective to manage unstructured data with many complex inter-relationships.

SUMMARY

In accordance with an aspect, there is provided a system for generating a dynamic visualization of a graph structure. The system has a processor configured to: load the graph structure into distributed memory of a plurality of nodes based the graph topology, the graph structure having vertices and edges and a graph topology; generate visual elements of an interface by traversing the graph structure over the plurality of nodes from a starting vertex node to an end node, the interface comprising a form field to receive a graph-based search as input; determine a set of vertices and edges of the graph structure satisfying the graph-based search; update the visual elements of the interface to indicate the set of vertices and edges; and activate a selected visual element corresponding to a vertex of the set of vertices and edges to expand its depth neighbors as additional visual elements of the interface.

In some embodiments, a distributed in-memory computation layer optimizes graph data placement on the plurality of nodes using the graph topology so that adjacent graph data are loaded onto a node or proximate nodes.

In some embodiments, each vertex has a degree or total number of edges connected to the vertex, wherein the distributed in-memory computation layer optimizes the graph data placement on the plurality of nodes using the degree.

In some embodiments, the distributed in-memory computation layer optimizes the graph data placement on the plurality of nodes based on physical node information such as location and workload.

In some embodiments, a distributed in-memory computation layer optimizes graph data placement on the nodes using a plurality of daemons and a central daemon for load balancing, each daemon connecting to a node, the plurality of daemons connecting to the central daemon, the central daemon interfacing with a node status table and a data placement table for the load balancing.

In some embodiments, the processor is configured to: store and update a vertex table structure for the vertices of the graph structure and an edge table for the edges of the graph structure; assign unique vertex identifiers for the vertices, the vertex table linking each vertex identifier to a set of vertex data values for the corresponding vertex; assign unique edge identifiers for the edges, the edge table linking each edge identifier to a set of edge data values for the corresponding edge; and determine the set of vertices and edges using a vertex identifier or an edge identifier.

In some embodiments, the processor is configured to assign a timestamp to a data cell of the vertex table or the edge table; and update the visual elements with a time dimension based on the timestamp.

In some embodiments, the processor is configured to: store the graph structure by storing a graph table with vertex data for the vertices of the graph structure and edge data for the edges of the graph structure; assign unique identifiers for the vertices and the edges, the graph table linking each identifier to a set of data values for a corresponding vertex or edge; and determine the set of vertices and edges using an identifier.

In some embodiments, the processor is configured to assign a timestamp to a data cell of the graph table; and update the visual elements with a time dimension based on the timestamp.

In some embodiments, the processor is configured to assign a unique graph identifier for the graph structure, and unique vertex identifiers for the vertices, and unique edge identifiers the edges, wherein an edge identifier for an edge is a combination of a set of vertex identifiers for vertices that the edge connects.

In some embodiments, the visual elements of the interface implement snapshot isolation on the graph structure data, and exploit snapshot isolation to track graph evolution over a plurality of time periods.

In some embodiments, the graph structure is implemented on top of a column store to maintain original structures of data, while adding additional graph structure to its data, wherein the processor is configured to model property graphs and persist property graphs with index free adjacency, wherein the processor allows multiple query methods on top of the same data.

In some embodiments, the system has a graph data management platform and a graph analytic layer, the graph data management platform for storing and process input data from data sources for the graph structures, the graph analytic layer for providing a set of tools for queries for the input to compute the visual elements from the distributed graph structures.

In some embodiments, the processor is configured to receive data from data transfer tools to load onto the distributed memory, a graph management system to store, update, query and compute the graph structure from the input, a graph analytic engine to determine graph operations for computations of the set of vertices and the edges in respond to the graph-based search, a machine learning engine to optimize graph parameters for the graph structure, a client application programming interface for data exchange between the system and the interface, and a visualization dashboard interface to generate the visual elements from the computations.

In accordance with an aspect, there is provided a method for generating a dynamic visualization of a graph structure. The method involves loading the graph structure into distributed memory of a plurality of nodes based the graph topology, the graph structure having vertices and edges and a graph topology; generating visual elements of an interface by traversing the graph structure over the plurality of nodes from a starting vertex node to an end node, the interface comprising a form field to receive a graph-based search as input; determining, by a processor, a set of vertices and edges of the graph structure satisfying the graph-based search; updating, by the processor, the visual elements of the interface to indicate the set of vertices and edges; assigning a timestamp to a data cell of the vertex table or the edge table; and updating the visual elements with a time dimension based on the timestamp; and activating, by the processor, a selected visual element corresponding to a vertex of the set of vertices and edges to expand its depth neighbors as additional visual elements of the interface.

In some embodiments, each vertex has a degree or total number of edges connected to the vertex, the method further comprising optimizing graph data placement on the plurality of nodes using the graph topology and the degree so that adjacent graph data are loaded onto a node or proximate nodes.

In some embodiments, the method involves optimizing graph data placement on the plurality of nodes using a plurality of daemons and a central daemon for load balancing, each daemon connecting to a node, the plurality of daemons connecting to the central daemon, the central daemon interfacing with a node status table and a data placement table for the load balancing.

In some embodiments, the method involves storing and updating a vertex table structure for the vertices of the graph structure and an edge table for the edges of the graph structure; assigning unique vertex identifiers for the vertices, the vertex table linking each vertex identifier to a set of vertex data values for the corresponding vertex; assigning unique edge identifiers for the edges, the edge table linking each edge identifier to a set of edge data values for the corresponding edge; and determining the set of vertices and edges using a vertex identifier or an edge identifier.

In some embodiments, the method involves storing the graph structure by storing a graph table with vertex data for the vertices of the graph structure and edge data for the edges of the graph structure; assigning unique identifiers for the vertices and the edges, the graph table linking each identifier to a set of data values for a corresponding vertex or edge; determining the set of vertices and edges using an identifier.

In some embodiments, the method involves assigning a unique graph identifier for the graph structure, and unique vertex identifiers for the vertices, and unique edge identifiers the edges, wherein an edge identifier for an edge is a combination of a set of vertex identifiers for vertices that the edge connects.

In accordance with an aspect, there is provided a method to implement graph structure on top of a column store of a graph table to enable a user to maintain original structures of data, while adding additional graph structure to its data, wherein the method allows modeling property graphs and persists and processes property graphs with index free adjacency, wherein the method allows multiple query methods on top of the same data.

In accordance with an aspect, there is provided a distributed graph system to store, update, query and compute graph data, with a visualization dashboard interface to generate visual representations of the computations.

In accordance with an aspect, there is provided a graph system comprising a graph data management system for storing and process input data from data sources as distributed graph structures.

In accordance with an aspect, there is provided a method to implement graph structures on top of a column store to enable a user to maintain original structures of data, while adding additional graph structure to its data. The method allows modeling property graphs and persists and processes property graphs with index free adjacency. The method allows multiple query methods on top of the same data.

In accordance with another aspect, there is provided a method to implement snapshot isolation on graph data, and exploit snapshot isolation to track graph evolution.

In accordance with another aspect, there is provided a distributed graph system having data storage resources to receive data from data transfer tools, a graph management system to store, update, query and compute graph data, a graph analytic engine to determine graph operations for computations in respond to user queries, a machine learning engine to optimize graph parameters, a client application programming interface for data exchange between the system and external systems, and a visualization dashboard interface to generate visual representations of the computations.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures:

FIG. 8 is a diagram of an example data locality management database table according to some embodiments;

FIG. 9 is a diagram of an example data implementation in HBase for graphs;

FIG. 10 is a diagram showing some example modifications to Apache Drill to support transactional SQL queries over HBase;

FIG. 11 is a diagram showing the functionally equivalent variation of having two separate tables, one being a Vertex table and the other being an Edge table, as compared to having one Graph table containing both vertices and edges.

DETAILED DESCRIPTION

Figure 1:
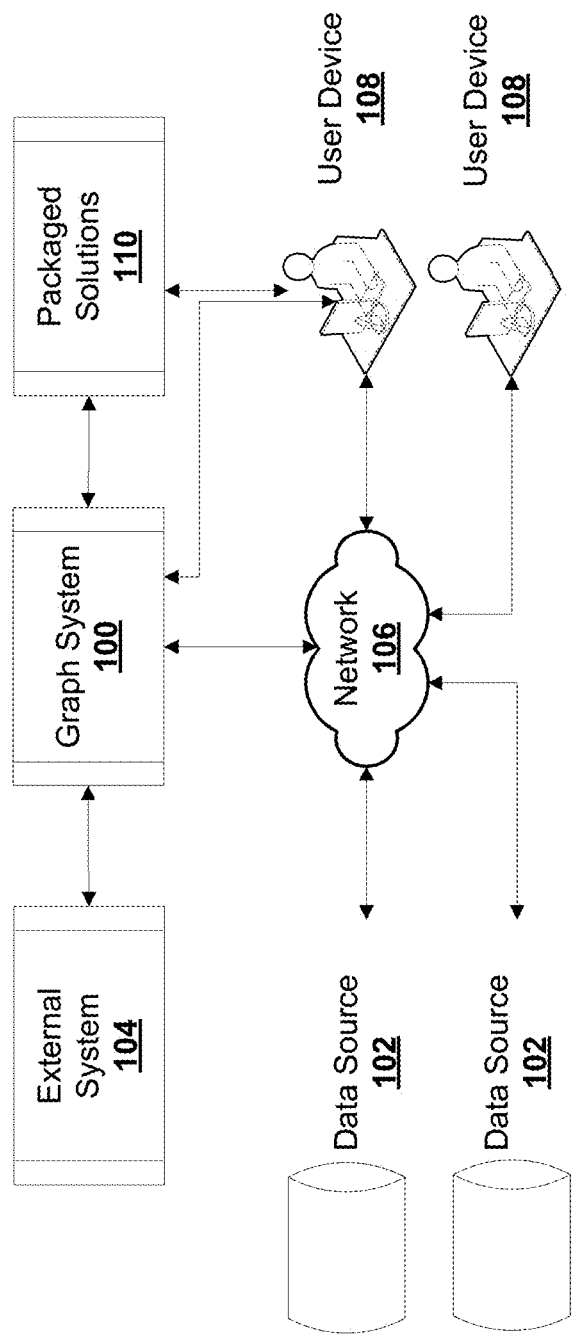
FIG. 1 is a diagram of an example graph system according to some embodiments.

FIG. 1 is a view of an example of a graph system 100 according to some embodiments. Graph system 100 provides a distributed graph data management platform and a set of analytic tools for interacting with the graph data management platform. Graph system 100 is built on top of an underlying cloud computing platform managed by external systems 104. Graph system 100 receives data from data sources 102 and/or user devices 108 via network 106. Graph system 100 can also be installed directly on user device 108 and access data stored on the user device 108. Graph system 100 stores, processes, and provides analysis on the data to fulfil commands from user devices 108 and a layer of packaged solutions 110 for different application areas. Although data sources 102 and user device 108 are shown separately, user device 102 can also be a data source 102 and provide input data to graph system 100. In some embodiments, packaged solutions 110 can be installed directly on user device 108 and/or accessed directly by user device 108.

Conventional relational data management systems do not store graph-structured data in its native form. Without modeling and storing data in its native form, querying the complex relationships between data cannot be achieved without compute and memory intensive operations. The query time grows exponentially as data size grows. To process graph-structured data, current data management solutions require the use of complicated and time consuming Extract Transform Load (ETL) processes to export data from data sources 102, transfer the exported data to graph data structures, and then load the newly structured data into a graph processing system. This ETL process, as well as growing query time, makes real-time decision-making based on dynamic changes of sizable graph-structured data difficult or impossible with relational data management systems. Embodiments described herein may address one or more shortcomings of conventional relational data management solutions.

Embodiments described herein provide graph system 100 to receive data from different types of data sources 102 to store and manage the data in a graph database. Graph system 100 can receive complex inter-connected data from data sources 102. Graph system 100 models data using graph topology. Graph databases use graph structures to store data, where the graph structures are defined by nodes, edges and properties. Nodes represent entities or data items and generally relate to a record in a relational database, or a document in a document database. Entities may include people, businesses, accounts, events, policies, and so on. Edges are the lines in a graph topology that connect nodes to other nodes and represent the relationship between nodes. Edges can be directed or undirected. Properties are pertinent information or characteristics relating to nodes and edges. Graph system 100 may use machine learning or heuristics to automatically detect patterns for the connections between nodes and value of properties.

Graph system 100 provides a graph database that persists and processes property graphs with index-free adjacency. Index-free adjacency means that every element contains a direct pointer to its adjacent elements and no index lookups are necessary. This means one can traverse from one node to the next in a small constant time, independent of the number of nodes and edges in the graph. This enables fast traversals of the graphs independent of the size of the graph. Graph databases provide better solutions for problem domains that have innate network structures (e.g. data with many-to-many relationships, complex sequences and workflows). Graph databases are native to such problem domains and require less modeling and programming efforts with higher productivity. Graph databases may provide superior query performance on complex joins than traditional relational database management systems (RDBMS).

Data sources 102 include data in a variety of formats, including unstructured and structured formats. Specific examples include database tables, comma separated values, messages, and real-time data streams such as JSON, for example. Data sources 102 may be Internet of Thing (IoT) devices, mobile devices, websites, data storage devices, vehicle systems, and so on. Graph system 100 consolidates structured, unstructured and graph data forms into one storage format by defining relationships between structure and unstructured data fields.

For data sources 102 that are stored in external systems 104, graph system 100 does not duplicate data in order to restructure them as graphs. Instead, graph system 100 builds on top of the columns and rows in external systems 104 and adds relationships between the data elements to define the graph structures, keeping the original data intact while adding additional graph structure, all in a single copy. This is advantageous for users that already implemented externals systems 104 and have data stored in external systems 104, since no ETL process is necessary.

Graph system 100 connects to other components in various ways including directly coupled and indirectly coupled via the network 106. Network 106 (or multiple networks) is capable of carrying data. Network 106 can involve wired connections, wireless connections, or a combination thereof. Network 106 may involve different network communication technologies, standards and protocols, such as for example Global System for Mobile Communications (GSM), Code division multiple access (CDMA), wireless local loop, WMAX, Bluetooth, Long Term Evolution (LTE) and so on. Network 106 may involve different physical media such as coaxial cable, fiber optics, transceiver stations and so on. Example network types include the Internet, Ethernet, plain old telephone service (POTS) line, public switched telephone network (PSTN), integrated services digital network (ISDN), digital subscriber line (DSL), and others, including any combination of these. Network 106 can be a local area network or wide area network.

Graph system 100 supports different types of queries from user devices 108 and customized solution systems 110. Graph system 100 supports different (perpendicular) query methods at the same time regardless of the original format of the underlying data. For example, graph system 100 supports structured SQL queries, unstructured columnar queries and graph queries at the same time. Graph system 100 provides a translation layer for structured and unstructured data to define relationships between the data (e.g. define graph structure for the data) and handle graph queries, for example. This may provide flexibility and convenience for data usage. Graph system 100 supports different query methods without requiring multiple copies of the original, underlying data. This may largely reduce user efforts in keeping all different copies of the same data in sync, especially when data size is large and data updates are frequent.

Graph system 100 supports strong data consistency across distributed machines in massive scale, without using consensus based protocols or a central transaction manager. As a data consistency example, a joint bank account may be accessible by two people. If one person withdraws $5 then the account balance is updated for access by the other person. This is important for concurrent access. Database transactions update, modify and delete data. Properties of database transactions include atomicity, consistency, isolation, and durability (ACID). Atomicity requires that each transaction either succeed or fail. If one part of the transaction fails, then the entire transaction fails, and the database state is left unchanged. A committed transaction impacts data of the database and an aborted transaction does not impact the data of the database. Consistency ensures that any transaction will bring the database from one valid state to another. Any data written to the database must be valid according to all defined rules. The isolation property ensures that the concurrent execution of transactions do not interfere with each other. Providing isolation is the goal of concurrency control. There are different levels of isolation. Durability ensures that once a transaction has been committed, it will remain so, even in the event of power loss, system failures, or errors. Graph system 100 supports ACID transactions.

Of the four ACID properties in a Database Management System (DBMS), the isolation property is the one most often relaxed. There are different isolation levels: serializable, repeatable reads, read committed, and read uncommitted. Serializable is the highest isolation level. With a lock-based concurrency control DBMS implementation, serializability requires read and write locks (acquired on selected data) to be released at the end of the transaction. When using non-lock based concurrency control, no locks are acquired; however, if the system detects a write collision among several concurrent transactions, only one of them is allowed to commit. In repeatable reads isolation, a lock-based concurrency control DBMS implementation keeps read and write locks (acquired on selected data) until the end of the transaction. However, range-locks are not managed, so phantom reads can occur. In read committed isolation, a lock-based concurrency control DBMS implementation keeps write locks (acquired on selected data) until the end of the transaction, but read locks are released as soon as the SELECT operation is performed (so the non-repeatable reads phenomenon can occur in this isolation level). Read uncommitted isolation is the lowest isolation level. In this level, dirty reads are allowed, so one transaction may see not-yet-committed changes made by other transactions. Snapshot isolation is a special isolation level weaker than the strongest serializable isolation level, but stronger than all the other isolation levels. Snapshot isolation is a guarantee that all reads made in a transaction will see a consistent snapshot of the database (in practice it reads the last committed values that existed at the time it started), and the transaction itself will successfully commit only if no updates it has made conflict with any concurrent updates made since that snapshot. Serializable isolation does not have any anomaly. Snapshot isolation avoids all anomalies except write skew anomaly. Snapshot isolation has higher throughput than serializable isolation, and thus is adopted by major DBMS. Graph system 100 supports snapshot isolation level, whereas other distributed graph systems generally only support the weaker "read committed" isolation level.

Graph system 100 provides a cloud computing solution for distributed transactions with strong data consistency based on autonomous decisions at each transaction without a single point of failure that centrally controls transactions. Graph system 100 may not require additional roll back in case of aborted transactions.

Graph system 100 provides a graph database with visualized business intelligence solutions for a variety of application domains 110.

Figure 2:
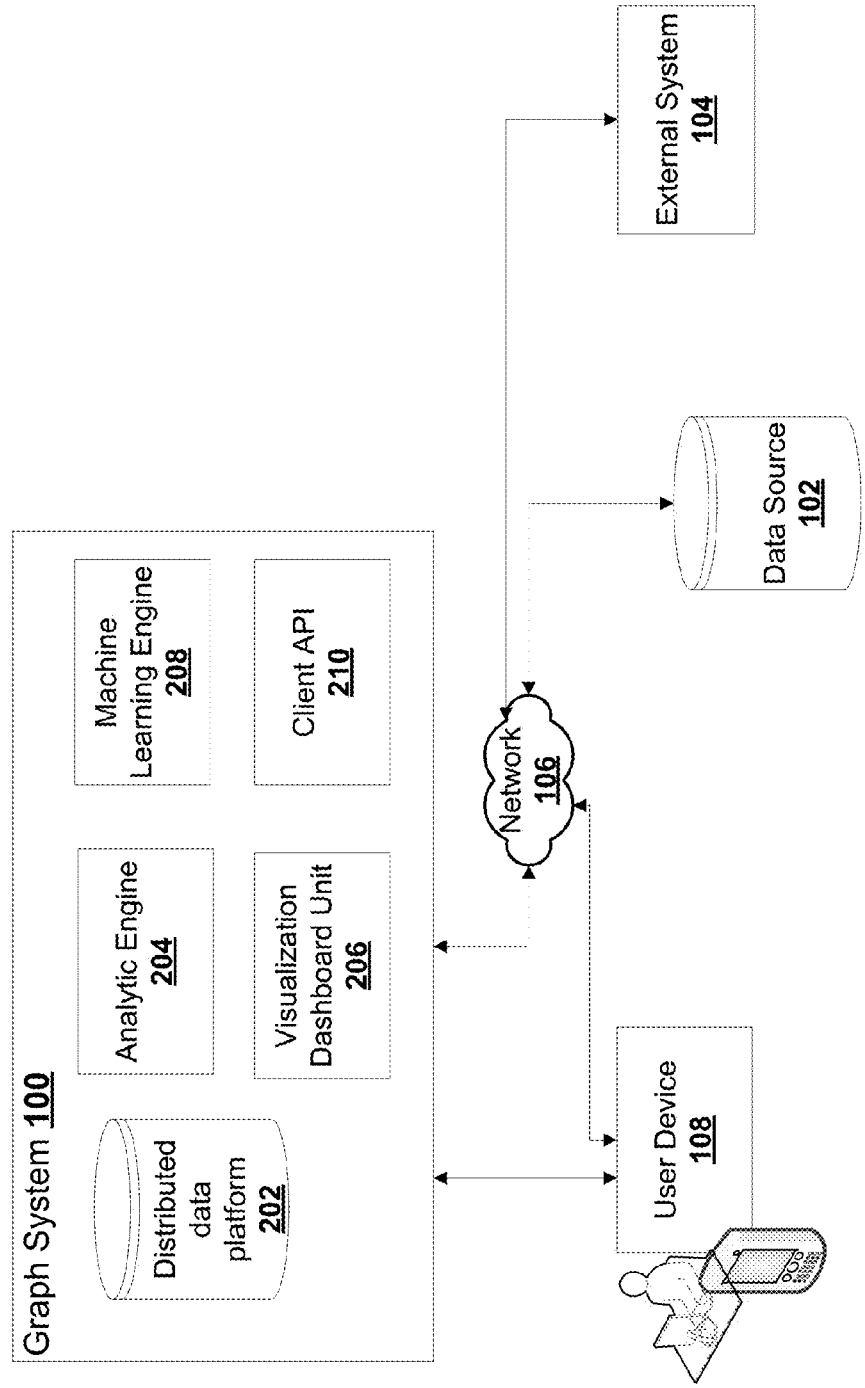
FIG. 2 is diagram of another example graph system according to some embodiments.

FIG. 2 is a view showing an alternate example of a graph system 100 according to some embodiments.

Graph system 100 has a distributed data platform 202, analytic engine 204, machine learning engine 208, visualization dashboard unit 206 and a client application programming interface (API) 210. The distributed data platform 202 provides a graph database. The distributed data platform 202 stores and processes data. The distributed data platform 202 generates and executes graph computations. Distributed data platform 202 supports structured SQL queries, unstructured columnar queries and graph queries. Distributed data platform 202 remodels data to implement the graph database to define relationships between data records using graph structures. Distributed data platform 202 can directly store graph-structure data or otherwise remodels non-graph-structured data to connect cells or data points of a relational database, for example. Distributed data platform 202 adds a graph structure layer to model the underlying data from data sources 102. Distributed data platform 202 uses timestamps to implement the time dimension for the graph data structures.

Analytic engine 204 translates a complex user query (e.g. graph search query) into a set of basic links between queries and graph algorithms for graph computations by distributed data platform 202. For example, a graph search query may require the computation of graph community detection and recommendation based on community information. Analytic engine 204 processes a higher-level user query to determine any associated underlying graph algorithms required for computing the results to respond to the query. The parsing of user input can be coded as fixed routines. In some embodiments, each routine can be plugged into the system 100 for a specifically designed problem solving package. The routines determine what algorithms are to be used and in what sequence. The following is an example of parsing user input and coding fixed routines. For example, in a corporate lending problem setting, a graph can be of nodes representing interconnected corporations and key persons and their family. A credit change for a node of a vertex can be propagated to adjacent vertices. A graph search query can be coded as first perform community detection process to find closely related vertices. The corporations have defaults in their previous lending history. This fixed routine can be coded as a BASH script file that encloses multiple commands to execute programs in sequence. Such routines can relate to analysis processes that need to be repeated multiple times. Yet another example of parsing user input is by recognizing user command line string and the arguments directly such that the system knows the command, the dependency files, and the command line argument to be passed in for execution.

Machine learning engine 208 receives graph computations structure values as input data, variables or parameters for different machine learning applications. Network attributes may provide values for input data, variables or parameters for different machine learning applications. Machine learning engine 208 may define data values for the nodes and edges of the graph. Machine learning engine 208 also provides novel implementations of different machine learning algorithms backed by graph traversal or algorithmic computations directly.

Client API 210 provides routines, protocols, and methods to enable user device 108 and packaged solutions 110 to interact with graph system 100.

Figure 12A:
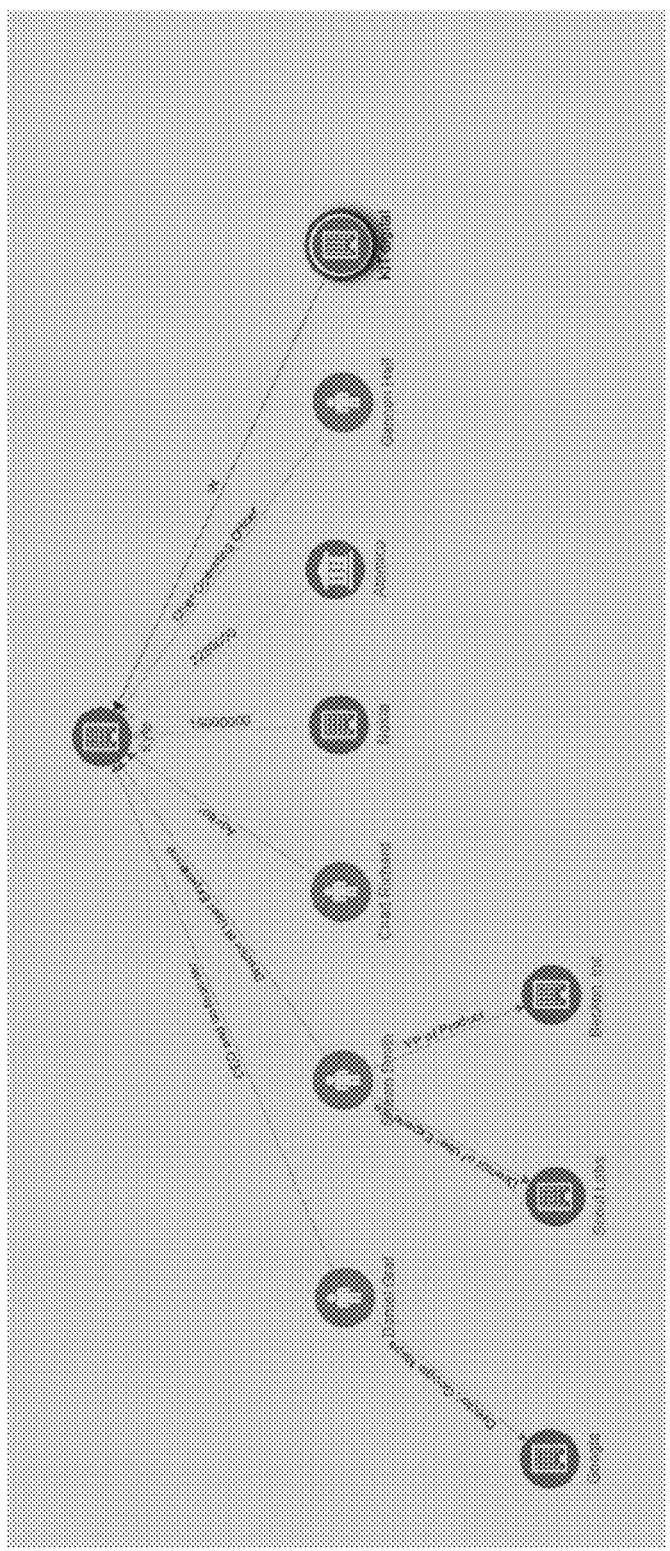
FIGS. 12A, 12B and 12C show example screenshots of a graphical user interface for visualizing a graph structure according to some embodiments.
Figure 12B:
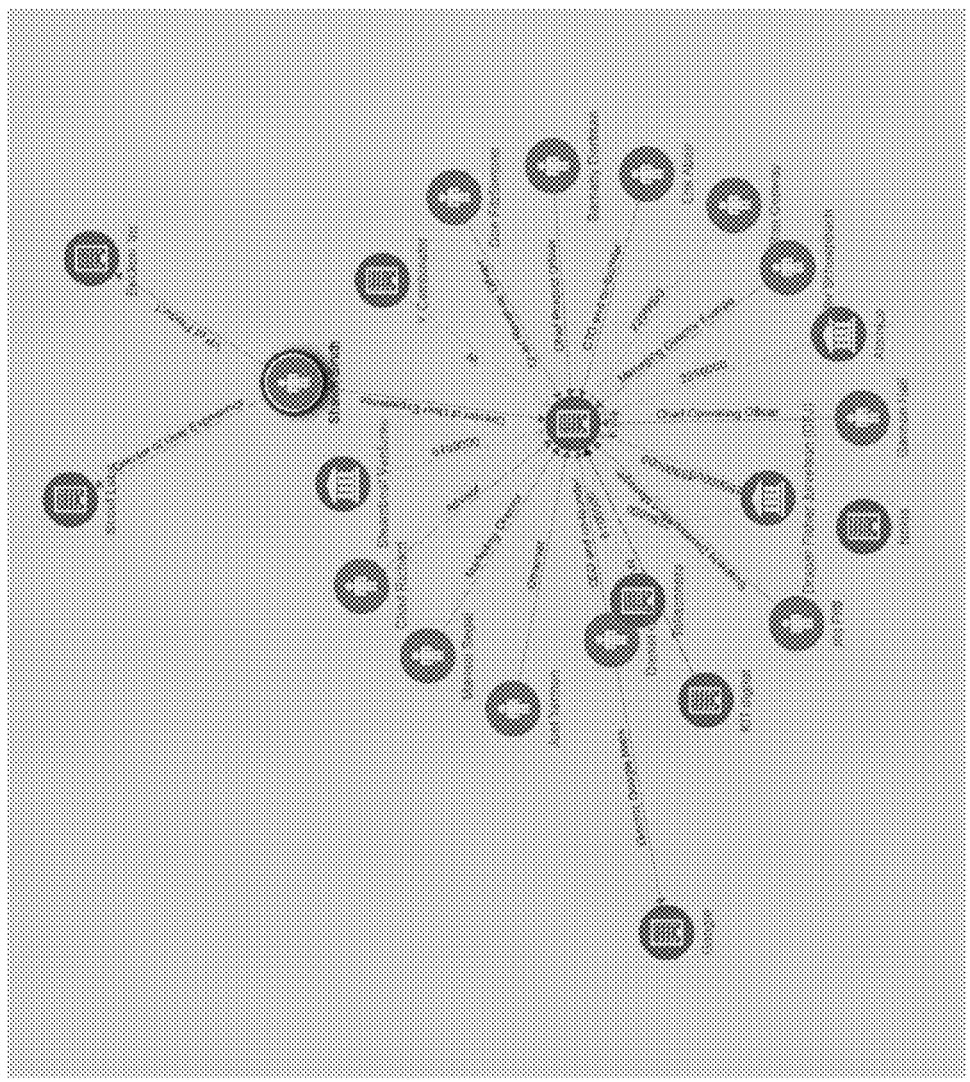
Figure 12C:
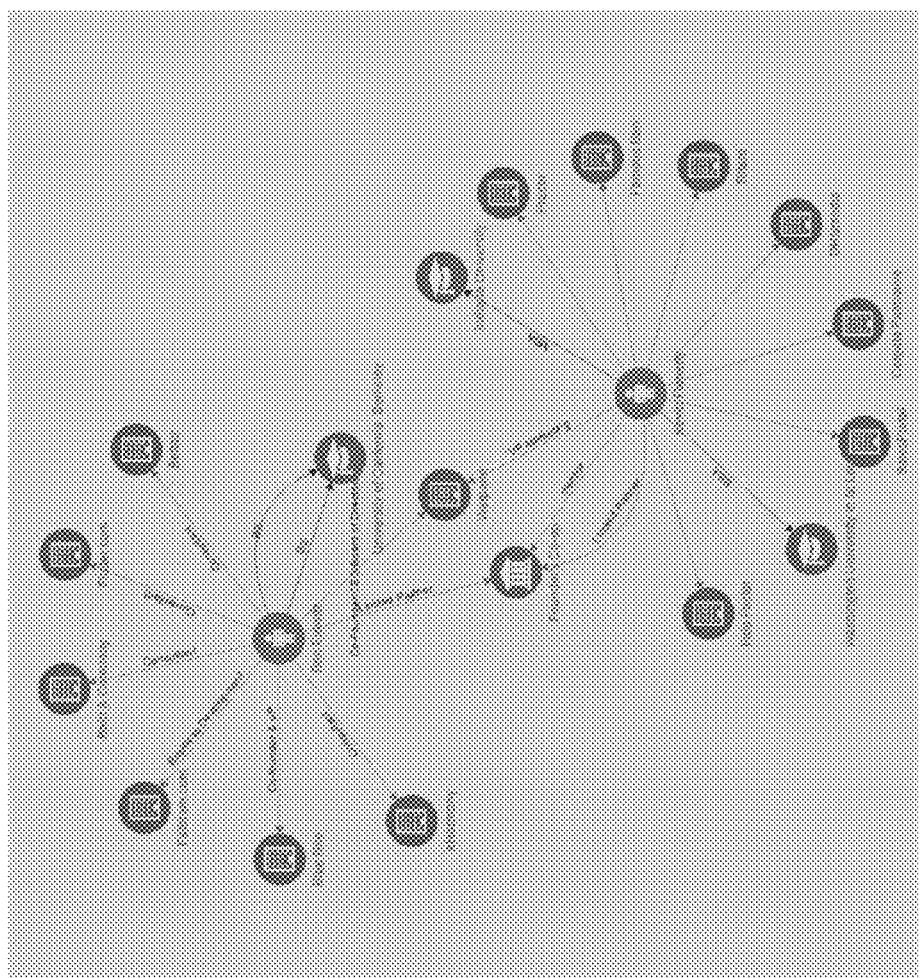

Visualization dashboard unit 206 provides a graphical user interface for interactive graph analytics and business reporting. FIGS. 12A, 12B and 12C show example screenshots of a graphical user interface with visual elements 1200, 1202, 1204 representing a graph structure. Users can choose different graph layouts to visualize the graph. The visualization is technically interactive instead of static visualization. The visualization can enable an iterative study step by step (for example, explore the graph by following a vertex's neighbor's neighbors at each depth) to arrive at a desirable result that can be easily exported to different formats. For example in FIGS. 12A, 12B and 12C, the graph of nodes representing corporations and their owners and top executives are interconnected. Some owners own multiple companies and take on different portions of share; some owners are implied to be connected when their companies are shown to tightly collaborate on some other corporation entities, taking up different shares. A graph visualization can show the latent or controller of an enterprise, who might not even be a shareholder of the enterprise but actually controls it through a multitude of other intermediate corporations. The visualization is generated by traversing the graph from a starting vertex. The interface allows a graph-based search as the initial input. Then the vertices and edges satisfying the search term are drawn. Users can now interact with the interface by right-clicking a selected vertex and expand optionally its depth X neighbors. For example, expand a vertex's friends' friends (e.g. depth 2 neighbors).

Figure 3:
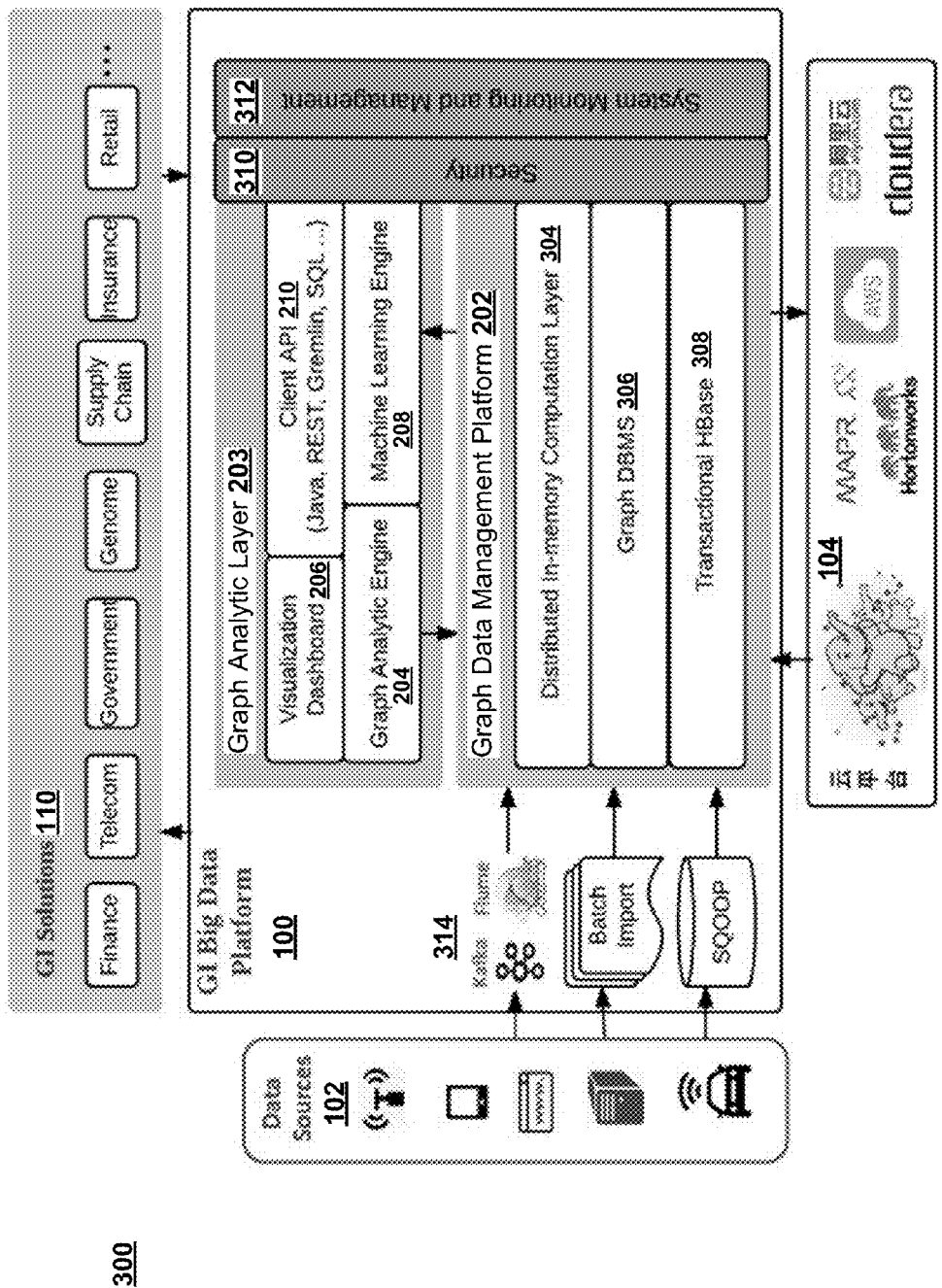
FIG. 3 is a diagram of another example graph system according to some embodiments.

FIG. 3 is a view showing another alternate example of a graph system 100 according to some embodiments. Graph system 100 can be based on a public and private cloud infrastructures implemented in 104.

Graph system 100 imports data from different data sources 102. The data sources 102 may include structured data such as those stored in relational databases and unstructured data. Graph system 100 includes data importing tools 314 that interface with different types of data sources 102 to provide flexible data import options, such as batch and bulk imports and distributed data streaming. Kafka and Flume are tools for real time streaming. Batch import enables batch loading of multiple files. SQOOP is a tool designed for efficiently transferring bulk data between external system 104 and structured data stores. The data importing tools 314 can be updated and modified to accommodate data from different types of data sources 102.

Graph system 100 manages the data using a distributed data platform 202, which is used to store, inquire, update and compute data with many to many relations. The data can be modeled by a network topology to show the relationships between the data points. In this particular implementation example, the distributed data platform 202 (which may be referred to as graph data management platform) has a transactional HBase 308, a graph database management system (DBMS) 306, and a distributed in-memory computation layer 304.

The graph data management platform 202 interacts with cloud infrastructure managed by external systems 104. External systems 104 include cloud providers that can provide infrastructure as a service with hardware storage.

The graph data management platform 202 stores data imported by data importing tools 314 into transactional HBase 308. The transactional HBase 308 interacts with external systems 104 to access hardware to store the data. Graph data management platform implements a client library through which clients communicate with HBase servers such that transactions are enabled, effectively turning HBase into "transactional HBase". The transactional HBase 308 enables concurrent access and update to the data. The transactional HBase 308 uses distributed transactions to guarantee data consistency in a concurrent access environment. This enables queries, updates and deletions to data in real-time. A distributed transaction is a database transaction that involves two or more data stores that are distributed among different physical locations. For transactional HBase™ 308, the data access is transactional using a client library. Further details are provided in *HBaseSI: Multi-row Distributed Transactions with Global Strong Snapshot Isolation on Clouds* by Chen Zhang, Hans De Sterck, the entire contents of which is hereby incorporated by reference.

Graph DBMS 306 can be a graph database implementation on top of the transactional HBase 308. HBase can provide a mechanism to store distributed sparse tables which means every row of a table can have a varying number of columns, and each row only stores column data when the data exists. Graph DBMS 306 uses a novel way to connect cells across different columns and rows across different tables. Essentially, that system 100 can support two ways of storing graph data.

One way is to store graph data in a graph structure composed of a set of vertices and a set of edges. This method can store vertices of the graph into a table named "Vertex" table and stores edges into a table named "Edge" table, for example. Each row of the vertex table corresponds to a vertex identified by a unique ID. The unique ID (e.g. graph identifier) of graph can be generated by input, for example. The unique ID (e.g. vertex identifier) of a vertex can be a UUID generated by Java, for example. The unique ID (e.g. edge identifier) of an edge can be a combination of the IDs of the vertices that the edge connects. Each vertex row contains columns corresponding to vertex properties. Example types of properties of a vertex representing a human are name, birthday, place of birth, country, and so on. Yet another example set of properties of a vertex representing a company is the creation time, date, number of board of directors, the current round of investment, etc. A property type for a vertex can have a property name and a property value. Column names for the table can be the property names, for example. Column values can be property values. If a vertex does not have a property that other existing vertices have, then the value for that column can be empty and might not physically store any data in HBase. In the Edge table, each row corresponds to an edge of the graph, with a column called From and another column called To, showing both end vertices of the edge. There can be a column called Directed to indicate whether the edge is directed or undirected, and with a set of properties belonging to each edge. A property type for an edge can have a property name and a property value.

A table has a set of data cells. A data cell can be linked to one or more timestamps to indicate a time associated with one or more values of the data cell. The timestamp associated with each data cell can represent when the data value is added to the system 100 so that timestamp-based system snapshots can be generated for analysis over the time dimension. As shown in FIG. 9, an example graph table 900 can indicate a graph that has 3 vertices and 2 edges. A vertex table 902 can indicate that Vertex v1 has two properties, v2 has three properties, and v3 has only one property. The table can be "sparse" in the sense that the number of columns are not fixed and can grow infinitely as more vertices are added, and that rows can have empty values under any column. Similarly, in the Edge table 904, two edges are shown by way of example. Edge e1 is a directed edge meaning that it is an arrow pointing from vertex v2 to v3. Edge e2 is an undirected edge between v1 and v2 meaning that the connection works both directions, either from v1 to v2 or from v2 to v1. Edge e2 does not have any properties in this example. The graph table 900 can be a combination of the vertex table 902 and the edge table 904 linked by common identifiers.

Timestamps can be implicitly maintained by HBase for each data cell (or column) and gives the time dimension of the data. Thus the structure of the graph can evolve over time. An example scenario for the graph evolution is how people are modeled in a graph inside a department store or shopping mall. For instance, the graph can define customers that are in a certain store or on a certain floor and connected. Each person can be directly connected to the store they are in as well as to persons 2 meters away from him. The system 100 can generate a dynamically changing graph of people over time in each of the stores. The graph evolution study can help visualize one or more clusters of people moving among stores and help identify co-clustering of customers (people that always stick together or close to each other) for merchandise recommendation based on cluster behavior. Another example of graph evolution is a friends network analysis. The change, increase or decrease, of friend network of an individual over time can be investigated to determine the activeness of the individual. The data structure or table 900 shown in FIG. 9 can have variations due to the heterogeneity nature of data, such as more properties of different column names, combining the Vertex table 902 and Edge table 904 into a Graph table 900 (or the example graph table 1100 shown FIG. 11). The table 900, 1100 can be both sparse tables. From an HBase system point of view they can be separate tables or one combined table if the system can interpret each table row. The vertex table 902 can link a vertex identifier (e.g. v1) to a set of vertex data values (e.g. Jack, USA). The edge table 904 can link an edge identifier (e.g. e1) to a set of edge data values (e.g. v2, v3, directed, family). A graph table 1100 can link an identifier (e.g. v1) to a set of data values (e.g. Jack, USA).

Combining vertex table and edge table as one large graph table can have advantages. Due to how HBase stores and manages data, if the vertex table and the edge table are split tables, they may be stored in separate HBase RegionServers on several distributed compute nodes. To obtain the edge information for a certain vertex, the system 100 may have to do remote read at a distributed compute node for a limited amount of data (only the edge info). The network roundtrip time in a distributed system when doing remote read cannot be neglected and can increase system read overhead, especially when randomly accessing a lot of vertex/edge data when doing graph traversal or depth X neighbor lookups. Combining the vertex table and edge table into one large table can help address this because HBase horizontally partitions its tables to be stored on the same RegionServer per partition. As mentioned above, the unique ID of an edge is generated by combing vertex IDs that the edge connects to. Therefore the edges of a vertex have high chances to be put in the same partition as one of the vertices the edge connects, since HBase automatically sorts rows by row keys.

In another way of data management, Graph DBMS 306 can add graph structures onto the current data structure without remodelling data stored by the transactional HBase 308. A graph structure defines one type of relationship between the data points. In this way, graph DBMS 306 converts two dimensional HBase tables to a three dimensional data space with added graph structures that define different types of relationships between cells or data points. For instance, the data can be stored in multiple two-dimensional tables and the system 100 indicates that rows in table 1 (for example, customer profile table) and distinct data values in column A in table 1 are linked to rows in tables 2 (for example, product table) and distinct data values in column B in table 2 as nodes in a graph through relationships established in table 3 (for example, transaction history table). The graph DBMS 306 can automatically translates the user design without user's manual effort into additional generated auxiliary tables for distinct data values in column A in table 1 and column B in table 2, and adds additional columns in the generated auxiliary tables as well as data tables 1, 2 and 3, dictating the specific relationships between the data items, effectively adding a complex graph structure to the current data without duplicating data in table 1, 2 and 3. More graphs can be further added based on the three tables by involving different columns in each data table.

Graph DBMS 306 can use the original form of the data and adds graph structures on top of the original data as needed. This gives flexibility for users to query the data as if the data is stored as a graph or in the original HBase table. This underlying data storage mechanism also allows graph data management platform 202 to support structured SQL queries, unstructured columnar queries and graph queries. Graph DBMS 306, therefore, does not require an extraction, transformation and loading of the original data if it is already stored in external systems 104. Not requiring duplicated copies of same data reduces data management complexities and provides storage efficiency.

In this example, the second way of storing a graph can have an advantage of allowing users to easy "dump" their existing relational tables into HBase and do minimal settings to construct a graph of interconnected information based on the relational tables without extra data reorganization. This may be useful to banks, for example, with a large number of existing databases and warehouses, with existing structured tables that cannot be easily decomposed and reorganize into graph ways. To create the links between tables, for example, extra HBase table entries must be created in the Edge table (create if not exist), managing an index of which row of which HBase relational table connects to which table which row of another table or data cell. If a relational table has two rows X and Y as the row keys. We can add an entry in the Edge table to link X and Y together as a row entry in the Edge table, setting From to X and To to Y. This is a simplified example. Another example is to connect two data cell values instead of row keys. It is more challenging in the latter case because data cell values in the original table might not be unique at all and cannot be used as row key as X and Y does. Therefore, system 100 can index on every column value that potentially would be needed to construct a graph structure. The index tables of the raw data becomes the Vertex tables of the graph.

The two ways of storing a graph can be used at the same time without conflicts, as long as vertices and edges are marked under the same graph name. Note that vertices and edges of the same graph are marked with the same graph name or identifier because when adding a vertex or an edge, the graph name has to be one that is unique. The advantage of storing graphs in both of the abovementioned ways gives the system analytic (OLAP) performance as well as real-time updates/deletes/additions support. This is due to the fact that the second way, the inputs are from banks or other large organizations' SQL dump files that are very structured and of great quantity. The system 100 can easily use the second way to management such data with a very low learning curve. In the meantime, users may have dynamic graph update requirements such as adding/removing a friend to his friend network in real-time, or changing status in the properties. All these will affect the information stored in graphs. For real-time analysis, they are critical but for batch they are not since they can optionally do T+1, loading all the data again from scratch every morning. In short, one of our competitive advantage.

When querying a graph, system 100 can query vertices and edges by their unique IDs, which can be used as the row keys in the storing HBase tables. The system 100 can also do complex graph queries using SQL or bare-bones HBase API in some embodiments. For example in FIG. 9, we can use HBase API, get all "To" edges for vertex v2, get all "From" edges for vertex v3 and then find out the same answer. This process can be trivially parallelized among the connected vertices of the same depth as separate query processes to speed up the computation when the graph is large.

To do graph query over the sparse table with SQL, by way of example a system called Apache Drill (http://drill.apache.org) can be used, which supports SQL on top of HBase. However, Apache Drill does not support transactions which break transactional data integrity when there is concurrent query over changing data. Therefore, system 100 makes modifications to Apache Drill code instead of using it directly, in order to add transactional support to its SQL queries. The system 100 can intercept the HBase calls from within Apache Drill and redirect to a transactional HBase system. In some embodiments, the transactional HBase API provides the same interfaces as normal HBase API and can therefore do replacement by changing the java import statements to use the system API in all files that call the normal HBase API. FIG. 10 is an example list of files that system 100 can modify over Apache Drill version apache-drill-1.9.0-SNAPSHOT to add transactional support backed by the transactional HBase system. FIG. 10 is a diagram showing some example modifications to Apache Drill to support transactional SQL queries over HBase.

In some embodiments, graph DBMS 306 adds a fourth dimension of time to data (e.g. millisecond granularity) by adding timestamps to all data points. A graph structure may vary at different times. For example, at time t, node 1 and node 2 may be connected by edge 1. At time t+1, node 1 and node 2 may no longer be connected, or connected by edge 2. Graph DBMS 306 tracks such changes by using timestamps. The timestamps are granular. The timestamps can be customized and can be in any user defined time interval, such as in seconds, hours, or days. Graph DBMS 306 can generate a time series snapshot of an entire graph at millisecond granularity using the timestamp property. Every data record has a timestamp and any change to data is timestamped. Graph DBMS 306 can provide whole database snapshots at any user-defined granularity for a data evolution study.

Embodiments described herein can add transactional support to Apache Drill based on HBase, to store graph structures in HBase in a novel way and do graph query over this data structure by the hybrid method of SQL through Apache Drill with transactional HBase and bare-bones HBase API. Embodiments described herein can allow graph evolution analysis by time dimension at the granularity of milliseconds for each vertex and edge structure and their individual property. In particular, an advantage obtained through the support for this hybrid querying mechanism is that, the system 100 allows storing graph data as sparse tables (e.g. as regular relational tables) to be queried by both conventional SQL and advanced graph methods. This enables good interoperability to existing relational databases (mysql, Oracle, etc.) and Hadoop stack technology tools (Hive, MapReduce, Spark, etc.) that manages and processes data in structured formats with no extra cost in data mappings. If the system 100 only allows data to be stored in graph format, such as the internal binary format used by another graph database called Neo4j, and does not allow SQL query over structured data, then users might have to make duplicated copies of their data in different formats in order to use different software for data analysis. For example, one in graph format and another in structured format (csv, tsv, etc.) and yet another in JSON format, introducing complex metadata management, ETL and data synchronization issues and costs. Alternatively, SQL query, graph query and other Hadoop stack tools can independently operate on the same piece of data with the underlying transactional HBase as the data store. The system 100 can provide a single source of truth but different lens or visual elements to view it and each lens is independent. It may not be necessary at all for requiring all the methods to co-exist or co-apply to the same data set in a hybrid manner at the same time or in the same query context. In other examples, users can store relational table without adding graph intel such that the tables are only queriable by SQL. In other examples, users can store graph structured data without meaningful SQL query equivalence.

The distributed in-memory computation layer 304 loads the graph data in memory for fast and efficient computation. The graph topology data is loaded in memory for fast and efficient graph computations. The computation is in response to a query or a graph algorithm. If the query involves an understanding of the overall structure of the graph then the distributed in-memory computation layer 304 loads the whole graph into distributed memory for computation. There are parts of the graph that are constantly or frequently being queried. These can also be loaded into the distributed in-memory computation layer for fast response time. This is how the graph data management platform 202 supports real-time graph traversals.

When loading data into the distributed in-memory layer, the system 100 optimizes data placement such that adjacent data from the graph topology perspective are put in the same node or near nodes. The loading process can make use of two pieces of information. One is the degree of each vertex, which is the total number of edges connected to a vertex. The other is the physical node information such as IP/location and work load.

Figure 7:
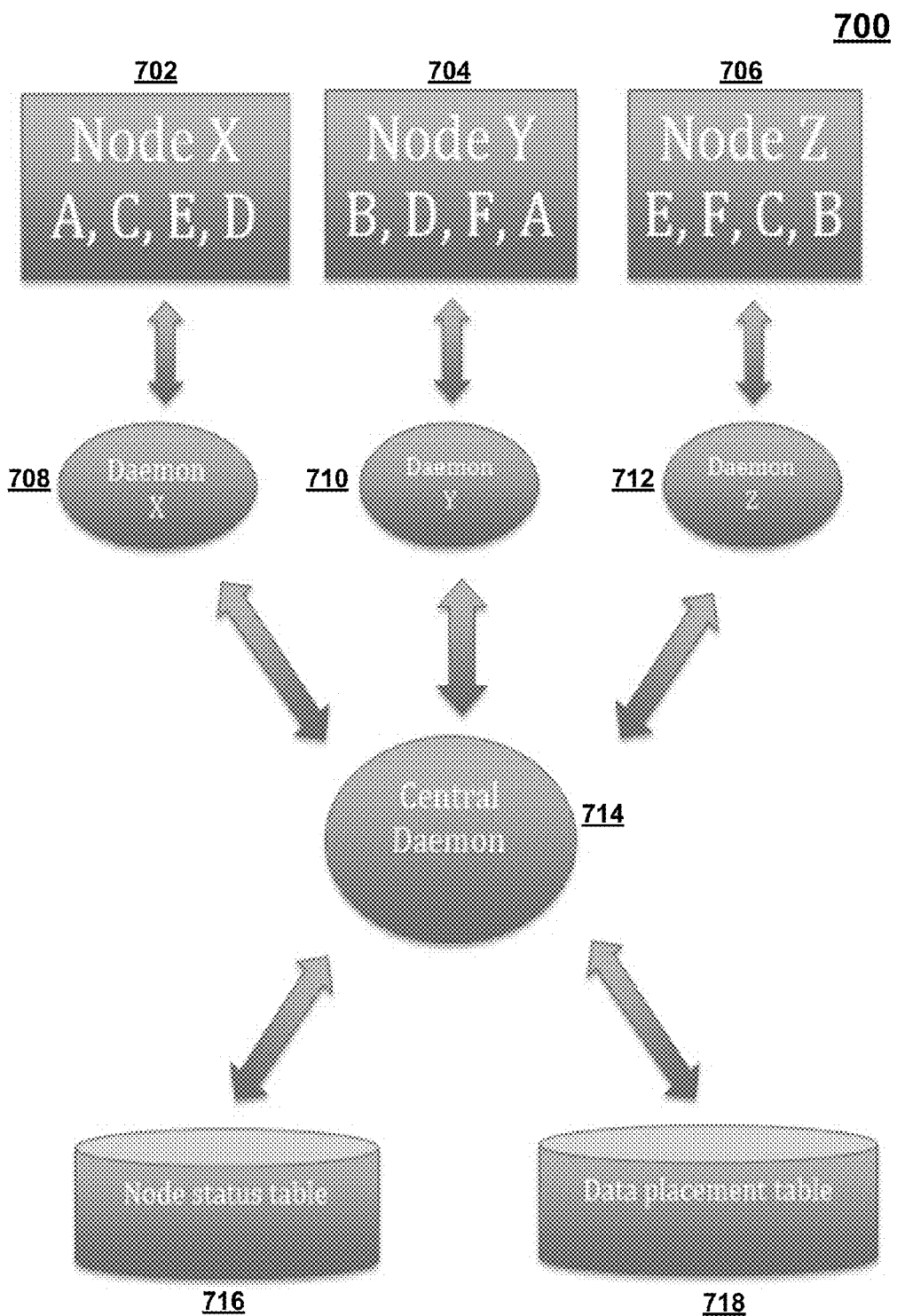
FIG. 7 is a diagram of a distributed data locality management framework for efficient graph computations making use of locally cached data copies according to some embodiments.

FIG. 7 is a view showing distributed data locality management framework 700 for efficient graph computations making use of locally cached data copies. As shown in FIG. 7, there can be three distributed compute nodes, Node X 702, Node Y 704, and Node Z 706, each hosting a segment of data, namely A, B, C, D, E, F. On each of the compute nodes, a Daemon process 708, 710, 712 is executed, which is responsible for coordination with a Central Daemon 714 for data placement (at data placement table 716) and schedule arrangements, as well as reporting local node status (at node status table 718) by way of calculating a local Load Score. The Daemon process that coordinates data placement constantly monitors the status of each local Daemon process such that if any local daemon process terminates abnormally, it will restart a new daemon process of the particular compute node, which requires passwordless ssh into each of the participating compute nodes from the compute node where the Central Daemon is run. Load Score is a score with values between 0 and 100, calculated by a weighted sum of CPU, memory, network and disk IO utilization and a number of other real-time status of the physical computer.

An example Load Score calculation can make use of several system information and parameters: current system active tasks, active and uninterruptible tasks in each CPU core queue, average memory and CPU utilization for the last 5 minutes and 10 minutes, standard deviation of network packets sent and received in the last 5 minutes for every second, etc. The total weighted sum of the above listed items mapped to Poisson distribution is one example way of calculating the Load Score. The Load Score is an adaptable approximation of the load of a compute node and is adjusted regularly concerning what metrics to include and what weights are used in obtaining the weighted sum. Central Daemon maintains data placement and compute node information in two tables, and can make data placement decisions based on the Load Score, and the number of compute nodes alive. For example, the Central Daemon ranks compute nodes by their Load Score in descending order such that data on the overloaded nodes with higher Load Scores can be redistributed to other less busy nodes with lower Load Scores. A mean Load Score is calculated such that all nodes with a Load Score lower than the mean are data redistribution targets. The granularity of data items is also an important factor when doing data placement. It is guaranteed that each compute node contains at least depth 2 neighbors of the vertex with highest degree on the particular compute node. If the total number of vertices plus depth 2 neighbors of high degree nodes are less than the total number of compute nodes, some compute nodes will not receive data placements but only cater to dynamically added new vertices and edges. Compute nodes can also leave and join the system from time to time, due to node failures, new nodes being added, network congestion, etc. The Central Daemon uses a time threshold to control whether or not a node is determined as frequently "chunning" node which will be blacklisted for a predefined time period.

FIG. 8 is a view showing how the data placement information and the compute node information can be managed in tables. In a Note status table 802, every row corresponds to a compute node. The columns correspond to properties such as status, recent heartbeat, recent assignment, load score, IP, and so on. Each node has corresponding property values. The Daemon process on each compute node sends heartbeat signal periodically every T seconds to the Central Daemon to be put into a Recent Heartbeat column (e.g. property value for the node). The values can be tagged with timestamp T. If the most recent heartbeat is longer than T seconds before the current time at the Central Daemon, the node will be marked to inactive (e.g. status property) and will trigger data rebalancing process. The Data placement table 804 has rows that correspond to data items and columns that correspond to properties such as status, stable assignment history time, stable assignment, transitive assignment history time, transitive assignment, and so on. In the Data placement table 804, data items can be decided by a graph partition algorithm in use. The system 100 cam apply techniques to partition our graph. Each data item in FIG. 8 exemplifies a graph partition. The status of a data item can be "assigned", meaning that a compute node is hosting it, and/or "in transit" meaning that the data item is moving from some nodes to others. The Stable assignment history time gives the last known stable assignment of the data item among compute nodes. The Stable assignment value gives the current compute nodes that are hosting the particular data item. The Transitive assignment history time shows the time and node a particular data item is moving to, which is also reflected in column Transitive assignment. Once the transitive assignment is finished, the status of the data item will be updated, the in transit status will be removed. In the case the data transitive placement is not successful for any reason, the Central Daemon will query the original hosting node and the new hosting node for status and decide on a new data placement strategy. More specifically, a timeout threshold is set in the transitive status by the Central Daemon. If data placement cannot be completed within the time threshold, the Central Daemon will clear the failed/suspended data transit and start a new data placement between available nodes after an active node liveliness query on all participating node Daemons.

The data rebalancing process can be triggered by multiple conditions, such as for example, active-turned inactive node (a node that was active, becomes inactive, which requires other nodes to take over the data items it has hosted), inactive-turned active node (a node what was inactive, becomes active, which is treated as if a new node joins the system), new node joining and old node leaving the system. The Central Daemon detects such state changes of the compute nodes, and monitors whether or not some nodes are flipping their status too quickly by a pre-set time threshold to justify a rebalancing process. If a rebalancing process starts, the Central Daemon will browse the Node status (e.g. table shown in FIG. 8) to find a set of active nodes with the highest Load Scores as the source transit set, and the lowest Load Scores as the destination transit set. Central Daemon can make sure each node host at least a pre-set number of data items, and use a plug-in schedule algorithm such as round-robin to do a 1-1 matching between nodes from source transit set to destination transit set such that all nodes in the source transit set has a transitive assignment relationship to some node in the destination transit set.

Graph system 100 has a graph analytic layer 203 on top of the graph data management platform 202. Graph analytic layer 203 has a set of tools and interfaces that allow users to explore and analyze the data stored in graph data management platform 202. In this particular example, graph analytic layer 203 contains graph analytic engine 204, a machine learning engine 208, a visualization dashboard 206, and a Client API 210.

The graph analytic engine 204 translates a complex user query into a set of basic queries understandable for Graph DBMS 306. Graph analytic engine 204 can also process a higher-level user query to determine one or more associated underlying graph algorithms needed for computing the results to respond to the query. The graph analytic engine 204 then interacts with the distributed in-memory computation layer 304 to execute these basic query and algorithms.

Machine learning engine 208 receives graph structural values as input parameters for different machine learning algorithms. Machine learning engine 208 may further define data values for the nodes and edges of the graph after the computation of machine learning algorithms in distributed in-memory computation layer 304.

The visualization dashboard unit 206 generates a graphical user interface for interactive graph analytics and business reporting, so that non-programmers can manage, understand and operate on the data. The visualization dashboard 206 receives user commands that can be converted into queries. The visualization dashboard then interact with graph analytic engine 204, machine learning engine 208, distributed in-memory computation layer 304, or graph DBMS 306, whichever is appropriate and necessary, to execute the query. The visualization dashboard 206 then converts the output data into visual elements.

Currently, other graph databases do not have an inherent visualization interface, and require the use of a third party library to visualize their data elements. In particular, the integrated visualization tool can lack iterative and interaction features. Real-time update and complex iterative analysis functionality to the graph through the visualization is not supported. Generally, in order to use third party visualization libraries you need to export database contents into an XML/JSON file or a file in other specific formats. Every time a new command is received through the visualization interface, the graph system needs to re-read database contents, re-export them, and then visualize the contents once the reading and exporting is finished. This process is single-threaded and time consuming. In graph system 100, visualization dashboard 206 integrates well into the graph data management platform 202, so there is no middle translation layer. In addition, the visualization dashboard 206 is multi-threaded, hence it can run queries concurrently from multiple threads which makes visualization of large graphs much faster.

Client API 210 provides protocols, and methods to enable user devices 108 and packaged solutions 110 to interact with graph system 100. User devices 108 and packaged solutions 110 may retrieve and query for data from graph system 100 using Client API 210. Client API 210 supports REST, Java, Python, Gremlin, and SQL.

Security layer 310 provides data security and integrity. System monitoring and management 312 provides a management dashboard to management and administration of the system 100. HDFS encryption, Apache Ranger (http://ranger.apache.org), Apache Knox (https://knox.apache.org) and Apache Atlas (http://atlas.incubator.apache.org) are used for data protection, authentication, authorization, auditing, and data governance.

Graph system 100 is intended as a general data management system that can be used across domains and industries. An additional layer of packaged solutions 110 can be developed on top of graph system 100 for different application domains, such as finance, telecom, government, supply chain, insurance, genome, and so on. Each domain has its own specific visualization needs and query functions. Graph system 100 can be used for various purposes such as risk management, network security, Information System supervision, supply chain optimization, warehouse management, recommendations, social network analysis, master data management, content management, identify and access management, and so on. For example, in a financial risk management system, the packaged solutions 110 may provide tools and interfaces to manage a full network of all persons and businesses that have various relationships between each other. This may provide financial institutions with a complete investor and borrower credit network view (see FIG. 4). This may be used for credibility check or fraud detection. As another example, in a telecommunications system, the packaged solutions 110 may provide wireless hotspot data analysis to build a network of connected devices. This may give valuable data analytics for shopping malls, government and police.

Figure 4:
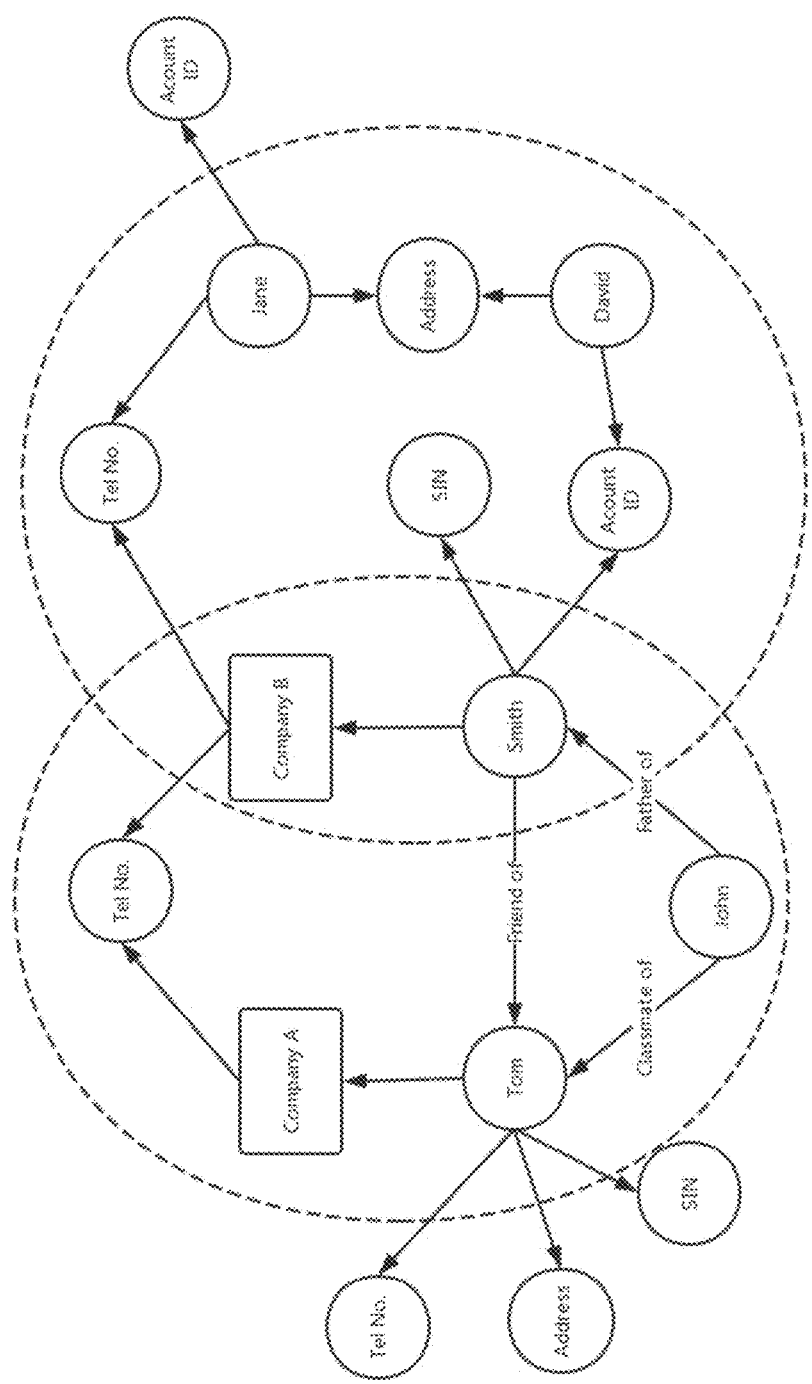
FIG. 4 is a view of an example graph structure for a fraud detection application.

FIG. 4 is a view showing example graph structures for a fraud detection application. Graph system 100 may provide a packaged solution for finance application domains, which may include risk management, anti-money laundry, financial product recommendations, master data management, identify and access management, and so on. For example, the visualization dashboard unit 206 may generate visual elements to represent graph structures for a fraud detection application.

The visual representation 400 of a graph structure is generated by visualization dashboard unit 206. The visual representation 400 illustrates assigning new beliefs to different nodes using different fraud detection algorithms to help build attributes of the nodes. Graph analytic engine 204 implements the algorithm. Machine learning engine can develop or refine fraud detection algorithms. Visualization dashboard 206 can be used to visualize graph structure that is derived as a result of the previously mentioned algorithms.

As shown in the visual representation 400, it is highly unlikely for two persons to validly have access to the same Account, and for an individual to share the same address with a company address, there for the "Company B-Jane-David-Smith" constructs a potential fraudster ring (left ring) worthy of analyst's investigation. According to social network theories, if "Company B" is a high-risk entity, "Company A" which shares resources (i.e. telephone number) with "Company B" could be considered contaminated. The "Company A-Tom-John-Smith-Company B" ring has two high-risk entities (i.e. Company B and Smith) and three contaminated entities (i.e. Tom, John, Company A), and could potentially be another fraudster ring. Machine learning can be implemented to predict if such an effect is true, and predict future fraudsters.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may be the only distributed graph DBMS with strong transactional support which guarantees data consistency in high concurrent access. The systems and methods described herein have stable query performance independent of size of the graph, and may have much better query performance (in terms of speed) when data scale is super large than older generation technologies (e.g. Relational DBMS, Resource Description Framework (RDF) stores). The systems and methods described herein are well integrated with Hadoop platform managed by external system 104, and therefore do not require complex and time-consuming ETL processes if users are already managing their data in the Hadoop platform, hence saving much more time and are much more cost effective in terms of storage hardware than other graph DBMS. The systems and methods described herein may be the only graph DBMS that support real-time dynamic graph and allow evolution study of graph on millisecond granularity. Current graph data management solutions do not have an integrated support for time series analysis on graph data. Instead, complex modeling and workarounds are needed. The systems and methods described herein may be the only graph DBMS that allow different types of queries as if the data is in structured RDBMS form, unstructured column store form, and graph vertex and edge form. None of current graph data management solutions store data in a way that supports using structured, unstructured and graph-based queries at the same time. The systems and methods described herein may be the only graph data management solutions that provide integrated visualization and business intelligence functions, which give user much more convenience and reduce the complexity of managing multiple systems and data stores for data analysis purposes.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

For simplicity only one graph system 100 is shown in FIGS. 1, 2, and 3 but there may be more graph systems 100 operable by users to access and exchange data. The graph systems 100 may be implemented using the same or different types of devices. The graph system 100 has at least one processor, a data storage device (including volatile memory or non-volatile memory or other data storage elements or a combination thereof), and at least one communication interface. The graph system 100 components may be connected in various ways including directly coupled, indirectly coupled via a network, and distributed over a wide geographic area and connected via a network (which may be referred to as "cloud computing").

Figure 5:
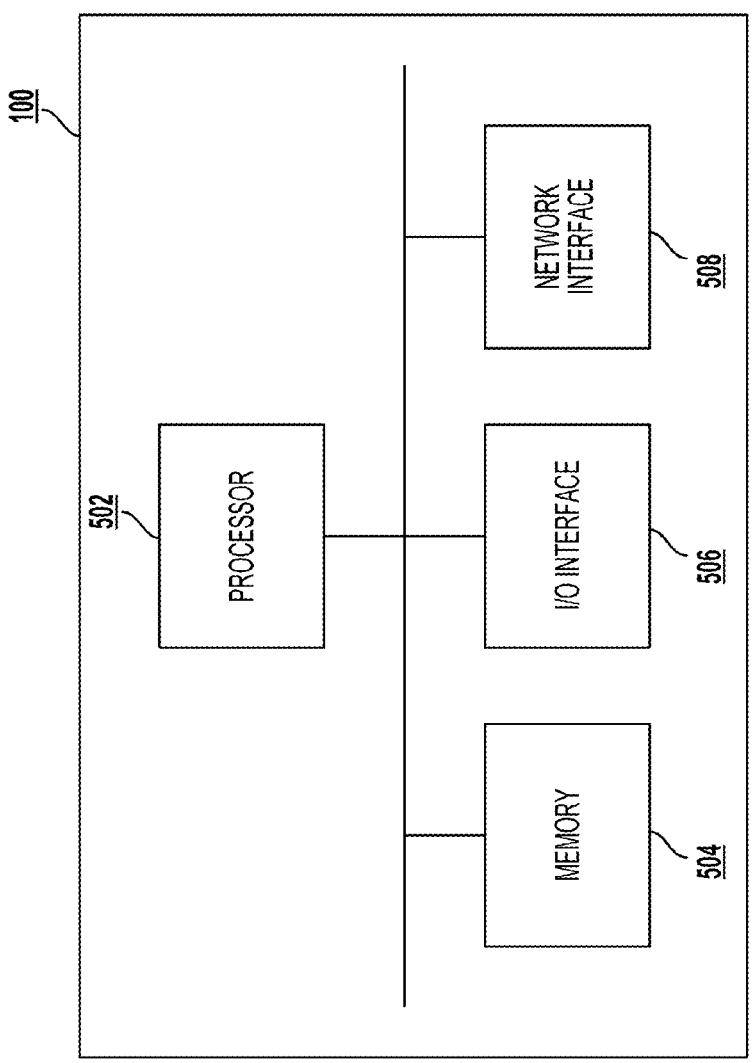
FIG. 5 is a diagram of an example computing system.

FIG. 5 is a schematic diagram of a computing device implementing graph system 100. As depicted, graph system 100 includes at least one processor 502, memory 504, at least one I/O interface 506, and at least one network interface 508.

Each processor 502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables computing device 100 to interconnect with one or more input devices, such as a keyboard, mouse, camera, touch screen and a microphone, or with one or more output devices such as a display screen and a speaker.

Each network interface 508 enables computing device 100 to communicate with other components, to exchange data with other components, to access and connect to network resources, to serve applications, and perform other computing applications by connecting to a network (or multiple networks) capable of carrying data.

Graph system 100 is operable to register and authenticate users (using a login, unique identifier, and password for example) prior to providing access to applications, a local network, network resources, other networks and network security devices. Graph system 100 may serve one user or multiple users.

Figure 6:
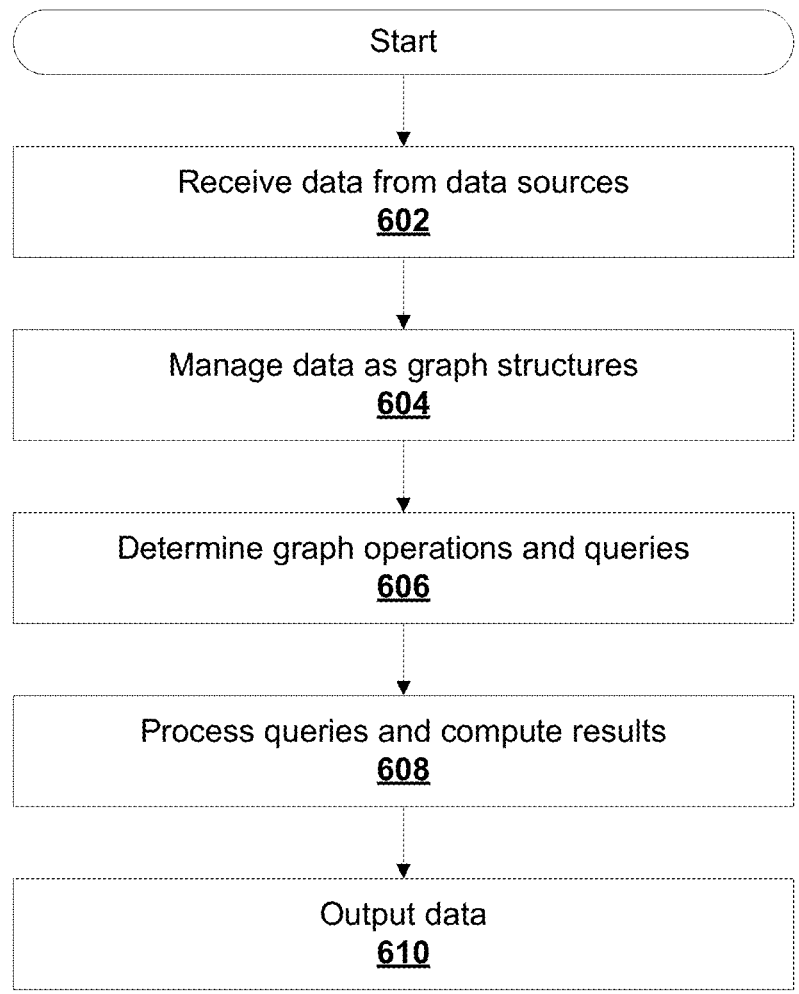
FIG. 6 is a flowchart diagram of an example process according to some embodiments.

FIG. 6 shows a flowchart of an example process for distributed data management. At 602, the graph system 100 receives data from data sources 102. For example, in an online retailing application, data that captures user browsing and shopping behaviour can be sent as a real-time data stream with data transfer tool 314 into graph system 100 (e.g. transactional HBase 308). The data can be stored into different HBase tables, and new columns can be added on the fly to capture different data fields (e.g. this can be unstructured data as each row can have different columns).

The user information can be stored in multiple two dimensional HBase tables. For instance, one customer account table with all basic user profile information, one customer browsing behaviour table listing all items each user has browsed, one product table that put different products into different categories, and a transaction table that captures all the orders each customer has made. An analyst comes in and wants to find new products a particular customer would be interested in.

At 604, the graph system 100 models the data to build a graph structure that define the relationships between the data points so that the analyst's command can be answered. For instance, relationships between two customers can be established if they have browsed or purchased the same item; relationships between two items can also be established if they have been viewed or purchased by the same person. The relationship can be weighted by the frequency of co-occurrence or dollar amount—whichever is more appropriate. All values of the nodes and links have timestamps. The graph structure capturing customer co-browsing/co-purchasing behaviour may look very different at different times. This means the analyst may choose to focus on shopping behaviour happened between certain time frames, such as Christmas season.

At 606, the graph system 100 processes user commands into system executable queries and determines appropriate graph algorithms to be run, so as to answer user requests. For instance, depending on how the analyst defines "relevance" for product recommendation, a community detection algorithm may be relevant to find a sub group of users who show very similar product tastes/needs (e.g. gardener, colleague students) and recommend to the customer the products other "community members" frequently buy. Machine learning engine 208 can be used here to determine which (set of) community detection algorithm(s) is most appropriate to solve the problem at hand. Alternatively, running a simple query that returns the products the customer's direct neighbours have bought could also fulfill the "product recommendation" command depending on the analyst's specific needs.

Once appropriate queries and algorithms are determined, the graph system 100 accesses relevant data in its data store, and execute those queries/algorithms to generate results at 608. At 610, the graph system 100 outputs results to user device 108 through its visualization dashboard 206, Client API 210, or packaged solutions 110.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for generating a dynamic visualization of a graph structure, the system comprising a processor configured to:
generate, based on a graph database, the graph structure, wherein the graph structure having vertices, edges and a graph topology, wherein the graph database that persists and processes property graphs with index-free adjacency, the index-free adjacency means that every element of the graph structure contains a direct pointer to its adjacent elements and no index lookup;
load the graph structure into distributed memory of a plurality of nodes based the graph topology, wherein each vertex of the vertices has a degree or total number of edges connected to the vertex, wherein every the element of the graph structure contains the direct pointer to the adjacent elements;
optimize, based on physical node information, graph data placement on the plurality of nodes using the graph topology and the degree during the loading of the graph structure into the distributed memory so that adjacent graph data are loaded onto a node of the plurality of nodes or proximate nodes of the plurality of nodes, wherein the optimizing of the graph data placement on the plurality of nodes includes using a plurality of daemons and a central daemon for load balancing, each daemon connecting to the node, the plurality of daemons connecting to the central daemon, the central daemon interfacing with a node status table and a data placement table for the load balancing, wherein the physical node information includes location and workload;
generate visual elements of an interface by traversing the graph structure over the plurality of nodes from a starting vertex node to an end node and by traversing the graph structure through direct pointers between the adjacent elements corresponding to the node of the plurality of nodes being traversed, the interface comprising a form field to receive a graph-based search as input;
determine a set of the vertices and the edges of the graph structure satisfying the graph-based search;
store and update a vertex table structure for the vertices of the graph structure and an edge table for the edges of the graph structure;
assign unique vertex identifiers for the vertices, a vertex table linking each vertex identifier to a set of vertex data values for corresponding vertex of the vertices;
assign unique edge identifiers for the edges, the edge table linking each edge identifier to a set of edge data values for corresponding edge of the edges;
determine the set of the vertices and the edges using the vertex identifier or the edge identifier to combine the vertex table and the edge table as a combined graph table to reduce data read overhead;
update the visual elements of the interface to indicate the set of the vertices and the edges by accessing the combined graph table, wherein the updating of the visual elements of the interface includes assigning a timestamp to a data cell of the vertex table or the edge table, and updating the visual elements with a time dimension based on the timestamp; and
activate a selected visual element corresponding to a vertex of the set of the vertices and the edges to expand depth neighbors, by conducting neighbor lookups from the combined graph table as additional visual elements of the interface.

2. The system of claim 1, wherein a distributed in-memory computation layer optimizes graph data placement on the plurality of nodes using the graph topology so that adjacent graph data are loaded onto a node or proximate nodes.

3. The system of claim 2, wherein each vertex has a degree or total number of edges connected to the vertex, wherein the distributed in-memory computation layer optimizes the graph data placement on the plurality of nodes using the degree.

4. The system of claim 1, wherein the processor is configured to assign a unique graph identifier for the graph structure, and the unique vertex identifiers for the vertices, and the unique edge identifiers the edges, wherein the edge identifier for an edge is a combination of a set of vertex identifiers for vertices that the edge connects.

5. The system of claim 1, wherein the visual elements of the interface implement snapshot isolation on graph structure data, and exploit snapshot isolation to track graph evolution over a plurality of time periods.

6. The system of claim 1, wherein the graph structure is implemented on top of a column store to maintain original structures of data while adding additional graph structure to its data, wherein the processor is configured to model property graphs and persist property graphs with index free adjacency, wherein the processor allows multiple query methods on top of same data.

7. The system of claim 1, further comprising a graph data management platform and a graph analytic layer, the graph data management platform for storing and process input data from data sources for the graph structures, the graph analytic layer for providing a set of tools for queries to compute the visual elements from the graph structures.

8. The system of claim 1, wherein the processor is configured to receive data from data transfer tools to load onto the distributed memory, a graph management system to store, update, query and compute the graph structure from the input, a graph analytic engine to determine graph operations for computations of the set of the vertices and the edges in respond to the graph-based search, a machine learning engine to optimize graph parameters for the graph structure, a client application programming interface for data exchange between the system and the interface, and a visualization dashboard interface to generate the visual elements from the computations.

9. A method for generating a dynamic visualization of a graph structure comprising:

generating, by a processor based on a graph database, the graph structure, wherein the graph structure having vertices, edges and a graph topology, wherein the graph database that persists and processes Property graphs with index-free adjacency, the index-free adjacency means that every element of the graph structure contains a direct pointer to its adjacent elements and no index lookup;

loading the graph structure into distributed memory of a plurality of nodes based the graph topology, wherein each vertex of the vertices has a degree or total number of edges connected to the vertex, wherein every the element of the graph structure contains the direct pointer to the adjacent elements;

optimizing, by the processor based on physical node information, graph data placement on the plurality of nodes using the graph topology and the degree during the loading of the graph structure into the distributed memory so that adjacent graph data are loaded onto a node of the plurality of nodes or proximate nodes of the plurality of nodes, wherein the optimizing of the graph data placement on the plurality of nodes includes using a plurality of daemons and a central daemon for load balancing, each daemon connecting to the node, the plurality of daemons connecting to the central daemon, the central daemon interfacing with a node status table and a data placement table for the load balancing, the node information includes location and workload;

generating, by the processor, visual elements of an interface by traversing the graph structure over the plurality of nodes from a starting vertex node to an end node and by traversing the graph structure through direct pointers between the adjacent elements corresponding to the node of the plurality of nodes being traversed, the interface comprising a form field to receive a graph-based search as input;

determining, by the processor, a set of the vertices and the edges of the graph structure satisfying the graph-based search;

storing and updating, by the processor, a vertex table structure for the vertices of the graph structure and an edge table for the edges of the graph structure;

assigning, by the processor, unique vertex identifiers for the vertices, a vertex table linking each vertex identifier to a set of vertex data values for corresponding vertex of the vertices;

assigning, by the processor, unique edge identifiers for the edges, the edge table linking each edge identifier to a set of edge data values for corresponding edge of the edges;

determining, by the processor, the set of the vertices and the edges using the vertex identifier or the edge identifier to combine the vertex table and the edge table as a combined graph table to reduce data read overhead;

updating, by the processor, the visual elements of the interface to indicate the set of the vertices and the edges by accessing the combined graph table, wherein the updating of the visual elements of the interface includes assigning a timestamp to a data cell of the vertex table or the edge table, and updating the visual elements with a time dimension based on the timestamp; and activating, by the processor, a selected visual element corresponding to a vertex of the set of the vertices and the edges to expand depth neighbors, by conducting neighbor lookups from the combined graph table as additional visual elements of the interface.

10. The method of claim 9, further comprising: assigning a unique graph identifier for the graph structure, unique vertex identifiers for the vertices, and unique edge identifiers the edges, wherein an edge identifier for an edge is a combination of a set of vertex identifiers for vertices that the edge connects.

11. A non-transitory computer readable memory storing machine instructions, which when executed by a processor, cause the processor to perform a method for generating a dynamic visualization of a graph structure, the method comprising:

generating, by a processor based on a graph database, the graph structure, wherein the graph structure having vertices, edges and a graph topology, wherein the graph database that persists and processes property graphs with index-free adjacency, the index-free adjacency means that every element of the graph structure contains a direct pointer to its adjacent elements and no index lookup;

loading the graph structure into distributed memory of a plurality of nodes based the graph topology, wherein each vertex of the vertices has a degree or total number of edges connected to the vertex, every the element of the graph structure contains the direct pointer to the adjacent elements;

optimizing, by the processor based on physical node information, graph data placement on the plurality of nodes using the graph topology and the degree during the loading of the graph structure into the distributed memory so that adjacent graph data are loaded onto a node of the plurality of nodes or proximate nodes of the plurality of nodes, wherein the optimizing of the graph data placement on the plurality of nodes includes using a plurality of daemons and a central daemon for load balancing, each daemon connecting to the node, the plurality of daemons connecting to the central daemon, the central daemon interfacing with a node status table and a data placement table for the load balancing, the physical node information includes location and workload;

generating, by the processor, visual elements of an interface by traversing the graph structure over the plurality of nodes from a starting vertex node to an end node and by traversing the graph structure through direct pointers between the adjacent elements corresponding to the node of the plurality of nodes being traversed, the interface comprising a form field to receive a graph-based search as input;

determining, by the processor, a set of the vertices and the edges of the graph structure satisfying the graph-based search;

storing and updating, by the processor, a vertex table structure for the vertices of the graph structure and an edge table for the edges of the graph structure;

assigning, by the processor, unique vertex identifiers for the vertices, a vertex table linking each vertex identifier to a set of vertex data values for corresponding vertex of the vertices;

assigning, by the processor, unique edge identifiers for the edges, the edge table linking each edge identifier to a set of edge data values for corresponding edge of the edges;

determining, by the processor, the set of the vertices and the edges using the vertex identifier or the edge identifier to combine the vertex table and the edge table as a combined graph table to reduce data read overhead;

updating, by the processor, the visual elements of the interface to indicate the set of the vertices and the edges by accessing the combined graph table, wherein the updating of the visual elements of the interface includes assigning a timestamp to a data cell of the vertex table or the edge table, and updating the visual elements with a time dimension based on the timestamp; and activating, by the processor, a selected visual element corresponding to a vertex of the set of the vertices and the edges to expand depth neighbors, by conducting neighbor lookups from the combined graph table as additional visual elements of the interface.

* * * * *